United States Patent
Zhang et al.

(10) Patent No.: US 9,110,456 B2
(45) Date of Patent: Aug. 18, 2015

(54) ROBOTIC MACHINING WITH A FLEXIBLE MANIPULATOR

(75) Inventors: Hui Zhang, West Hartford, CT (US); ZhongXue Gan, Windsor, CT (US); Jianjun Wang, West Hartford, CT (US); George Zhang, Windsor, CT (US)

(73) Assignee: ABB Research Ltd., Zurich (CH)

( * ) Notice: Subject to any disclaimer, the term of this patent is extended or adjusted under 35 U.S.C. 154(b) by 1124 days.

(21) Appl. No.: 11/220,174

(22) Filed: Sep. 6, 2005

(65) Prior Publication Data

US 2006/0048364 A1    Mar. 9, 2006

Related U.S. Application Data (60) Provisional application No. 60/607,939, filed on Sep. 8, 2004.

(51) Int. Cl.
*B23Q 17/00* (2006.01)
*G05B 19/19* (2006.01)
(Continued)

(52) U.S. Cl.
CPC ............ *G05B 19/19* (2013.01); *B23Q 17/0966* (2013.01); *B25J 9/1633* (2013.01); *B25J 9/1641* (2013.01); *G05B 2219/37319* (2013.01); *G05B 2219/37355* (2013.01); *G05B 2219/42033* (2013.01); *G05B 2219/45068* (2013.01); *G05B 2219/49079* (2013.01);
(Continued)

(58) Field of Classification Search
CPC ............ B23Q 17/0966; B23Q 17/0505; B25J 9/1633; B25J 9/1638; B25J 9/1641; G05B 2219/37355; G05B 2219/49079; G05B 2219/49099

USPC .......... 700/245, 260; 318/568.16; 901/6, 7, 8, 901/26, 41, 9, 10; 134/62, 66, 76, 140; 29/26 A, 40, 242, 343.54, 348, 407.08, 29/709; 414/676, 735, 736; 269/20, 309; 82/125, 160; 483/14, 901
See application file for complete search history.

(56) References Cited

U.S. PATENT DOCUMENTS

| | | | | |
|---|---|---|---|---|
| 4,761,596 A | * | 8/1988 | Nio et al. ...................... | 700/259 |
| 5,177,563 A | * | 1/1993 | Everett et al. ................. | 356/621 |
| 5,737,500 A | * | 4/1998 | Seraji et al. ................... | 700/251 |

(Continued)

OTHER PUBLICATIONS

Jarabek et al., Robot Position Servoing Using Visual Gap Measurement, 1998, Internet, p. 26-30.*

(Continued)

*Primary Examiner* — Mussa A Shaawat
*Assistant Examiner* — Kyung Kim
(74) *Attorney, Agent, or Firm* — Michael M. Rickin; Melissa J. Szczepanik (57) ABSTRACT

A robot machining with a flexible manipulator has an end effector which may either hold the tool to perform the machining or the work piece to be machined. A signal representative of a force applied by said tool to said work piece is used to control either the relative motion between the tool and the work piece to give a controlled material removal rate (CMRR) or the relative position between the tool or the work piece to provide deformation compensation or both CMRR and deformation compensation. A force sensor provides the signal for deformation compensation. For CMRR the signal may be obtained from either a force sensor or the current flowing in the motor of the robot's spindle. The force sensor can be mounted either on the robot or together with either the tool or work piece adjacent to the robot.

13 Claims, 10 Drawing Sheets

(51) Int. Cl.
*B23Q 17/09* (2006.01)
*B25J 9/16* (2006.01)

(52) U.S. Cl.
CPC ............ *G05B 2219/49082* (2013.01); *G05B 2219/49099* (2013.01); *Y10T 29/49776* (2015.01); *Y10T 29/53039* (2015.01)

(56) References Cited

U.S. PATENT DOCUMENTS

| | | | | |
|---|---|---|---|---|
| 5,761,940 | A | * | 6/1998 | Moore et al. .................. 72/19.4 |
| 5,996,691 | A | * | 12/1999 | Norris et al. ............. 166/250.03 |
| 6,149,506 | A | * | 11/2000 | Duescher ........................ 451/59 |
| 6,156,030 | A | * | 12/2000 | Neev ............................. 606/10 |
| 6,476,575 | B1 | | 11/2002 | Fainstein et al. |
| 6,612,912 | B2 | * | 9/2003 | Yasui et al. ..................... 451/56 |
| 6,891,128 | B1 | * | 5/2005 | Sidlinger et al. ......... 219/137.43 |
| 7,143,624 | B2 | * | 12/2006 | Stone et al. ..................... 72/361 |
| 7,246,985 | B2 | * | 7/2007 | Ferrara ......................... 414/217 |
| 2002/0173878 | A1 | * | 11/2002 | Watanabe et al. ............. 700/245 |
| 2003/0050734 | A1 | * | 3/2003 | Lapham ........................ 700/245 |
| 2003/0173341 | A1 | * | 9/2003 | Matsushita .............. 219/121.63 |
| 2004/0111183 | A1 | * | 6/2004 | Sutherland et al. ........... 700/245 |
| 2004/0153213 | A1 | * | 8/2004 | Lapham ........................ 700/245 |
| 2004/0193293 | A1 | * | 9/2004 | Watanabe et al. ............... 700/56 |
| 2005/0159840 | A1 | * | 7/2005 | Lin et al. ....................... 700/245 |
| 2005/0166413 | A1 | * | 8/2005 | Crampton ....................... 33/503 |
| 2005/0267695 | A1 | * | 12/2005 | German .......................... 702/41 |

OTHER PUBLICATIONS

Rupp et al., A Gripper and Sensor System for Controlled Slip and Force, 1994, IEEE, p. 329-334.*
Kuribayashi et al., A New Robot Finger Force Sensor Using Neural Network, 1993, IEEE, p. 217-222.*
Cervera et al., A Sensor-Based Approach for Motion in Contact in Task Planning, 1995, IEEE, p. 468-473.*
Zheng et al. Robot Force Sensor Interacting with Environments, 1991, IEEE, p. 156-164.*

* cited by examiner

ROBOTIC MACHINING WITH A FLEXIBLE MANIPULATOR

CROSS REFERENCE TO RELATED APPLICATION

This application claims the priority of U.S. provisional patent application Ser. No. 60/607,939 filed on Sep. 8, 2004, entitled "Machining With Flexible Manipulator: Toward Improving Robotic Machining Performance" the contents of which are relied upon and incorporated herein by reference in their entirety, and the benefit of priority under 35 U.S.C. 119(e) is hereby claimed.

FIELD OF THE INVENTION

This invention relates to robots and more particularly to robotic machining.

DESCRIPTION OF THE PRIOR ART

The automotive industry represents the fastest-growing market segment of the aluminum industry, due to the increasing usage of aluminum in cars. The drive behind this is not only to reduce the vehicle weight in order to achieve lower fuel consumption and improved vehicle performance, but also the desire for more sustainable transport and the support from new legislation. Cars produced in 1998, for example, contained on average about 85 Kg of aluminum. By 2005, the automotive industry will be using more than 125 Kg of aluminum per vehicle. It is estimated that aluminum for automotive industry alone will be a 50 B$/year market.

Most of the automotive aluminum parts start from a casting in a foundry plant. The downstream processes usually include cleaning and pre-machining of the gating system and riser, etc., machining for high tolerance surfaces, painting and assembly. Today, most of the cleaning operations are performed manually in an extremely noisy, dusty and unhealthy environment. Therefore, automation for these operations is highly desirable. However, due to the variations and highly irregular shape of the automotive casting parts, solutions based on a CNC machining center usually presented a high cost, difficult-to-change capital investment.

To this end, robotics based flexible automation is considered as an ideal solution for its programmability, adaptivity, flexibility and relatively low cost, especially for the fact that the industrial robot is already used to tend foundry machines and transport parts in the process. Nevertheless, the foundry industry has not seen many success stories for such applications and installations of industrial robots. Currently, more than 80% of the application of industrial robots is still limited to the fields of material handling and welding.

The major hurdle preventing the adoption of robots for material removal processes is the fact that the stiffness of today's industrial robot is much lower than that of a standard CNC machine. The stiffness for a typical articulated robot is usually less than 1 N/µm, while a standard CNC machine center very often has stiffness greater than 50 N/µm.

Most of the existing literature on machining process, such as process force modeling described by Sung I. Kim et al., 2003, "Robust Machining Force Control with Process Compensation," *Journal of Manufacturing science and engineering*, Vol 125, pp. 423-430; and Jeffrey L. Stein et al., 2002, "Monitoring Cutting Forces In Turning: A Model-Based Approach," *Journal of Manufacturing science and engineering*, Vol 124, pp. 26-31, accuracy improvement described by Seung-Han Yang, 1996, "Real-time compensation for geometric, thermal, and cutting force induced errors in machine tools," Ph.D. dissertation, The University of Michigan and vibration suppression described by E. Budak et al., 1998, "Analytical Prediction of Chatter Stability Conditions for Multi-Degree of Systems in Milling. Part I: Modeling, Part II: Applications," *Transactions of ASME, Journal of Dynamic Systems, Measurement and Control*, vol. 120, pp. 22-36 are based on the CNC machine.

Research in the field of robotic machining is still focused on accurate off-line programming and calibration [see for example Y. H. Chen et al., 1999. "Implementation of a Robot System for Sculptured Surface Cutting. Part 1. Rough Machining". *Int. Journal of Advanced Manufacturing Technology*, Vol 15. Pp. 624-629 and M. Sallinen et al., 2000, "Flexible Workobject Localisation for CAD-Based Robotics", Proceedings of SPIE Intelligent Robots and Computer Vision XIX: Algorithms, Techniques, and Active Vision. Boston, USA, 7-8 Nov. 2000. USA. Vol. 4197 (2000), pp. 130-139]. Akbari et al., 2000, "Autonomous Tool Adjustment in Robotic Grinding," *The int. conf. on Precision Engineering (ICoPE)*, 121-126 describe a tool angle adjustment method in a grinding application with a small robot. In that case the process force is very small. Matsuoka et al., 1999, "High-speed end milling of an articulated robot and its characteristics," *Journal of Materials Processing Technology* Volume: 95, Issue: 1-3 pp. 83-89 study the characters of an articulated robot in a milling process avoiding large process force by using an end mill with small diameter and high spindle speed. Without the capability of realtime force control, the method to eliminate the force effect on the robotic machining process has not been fully addressed in the research community or in industry.

Machining processes, such as grinding, deburring, polishing, and milling are essential force tasks whose nature requires the end effector to establish physical contact with the environment and exert a process-specific force. The inherent lower stiffness of the robot has presented many challenges to execute material removal applications successfully. The first one is the structure deformation and loss of accuracy due to the required machining force. The predominant cutting action in machining involves shear deformation of the work material to form a chip. The contact between the cutting tool and the workpiece generates significant forces. As a result, a perfect robot program without considering contact and deformation will immediately become flawed as the robot starts to execute the machining task. Unlike multi-axis CNC machine centers, such deformation is coupled and varies even subjected to the same force in different workspace locations. Such coupling results in deformation not only in the direction of reaction force and can generate some counter-intuitive results.

Secondly, the lower stiffness also presents a unique disadvantage for machining of casting parts with complex geometry, which means non-uniform cutting depth and width. As a result, the machining force will vary dramatically, which induces uneven robot deformation. What this means is that the flatness of the machined plane of the casted part, for example a cylinder head, is so inferior that it renders the robotic process unable to meet the typical tolerance of 0.3~0.5 mm for a casting cleaning operation.

In general practice, machine tools maximize the material removal rate (MRR) during roughing cycles by applying all of the available spindle power to the machining process. When machines use carbide tools for roughing operations, the available spindle power is usually the limiting factor on the MRR. In conventional robot programming and process planning practice, the cutting feed rate is constant even with significant variation of cutting force from part to part, which dictates a conservative cutting feed rate without violating the operational limits. Therefore, it is desirable to maximize the MRR and minimize cycle time by optimizing the cutting feed rate based on a programmed spindle load. By optimizing the feed rate in real time, conservative assumptions and process variations can be compensated for to thereby help reduce cycle time. Every part, including the first, is optimized automatically, eliminating the need for manual part program optimization.

The present invention improves the robotic machining quality with the low stiffness, low accuracy robot and the robotic machining efficiency by providing real time optimization to maximize the MRR. The present invention improves robotic machining accuracy by reducing in real time the process, that is, machining, force induced deformation of the work piece that occurs, as is described above, in the prior art machining processes using a robot. Thus by using the present invention, industrial robots are made to provide end-effector position accuracies under contact situations equal to the end-effector position repeatabilities they already provide in non-contact situations. Such robotic machining can result in significant cost savings in many applications.

SUMMARY OF THE INVENTION

In a system having a robot and a tool for machining a work piece, the robot including a plurality of robot joints, a method for compensating for deformation of the robot joints during the machining comprising:
obtain a stiffness model which relates the force applied at a tip of the tool to the deformation of the tool tip;
obtaining after the stiffness model is obtained a signal from a force sensor of a force applied by the tool to the work piece;
using the signal and the stiffness model to determine the deformation of the robot joints due to the force applied by the tool to the work piece; and
using the determined deformation of the robot joints to modify the relative position between the tool and the work piece to compensate for the deformation of the robot during the machining.

In a system having a robot and a tool held by the robot for machining a work piece a method for compensating for variability of height of the surface of the work piece during the machining comprising:
using only the tool held by the robot to remove material from the surface of the work piece;
setting a constant material removal rate for the tool to remove material from the surface of the work piece;
generating from a force sensor a signal representative of the force applied in real time to the work piece by the tool during the machining of the work piece by the tool; and
using the force sensor signal to modify the relative speed between the tool and the work piece to maintain a constant material removal rate during the machining of the work piece by the tool.

A controller for controlling a robot having a plurality of joints and carrying a tool for machining a work piece, the controller having software executable to:
obtain a stiffness model of the robot;
obtain after the stiffness model is obtained a signal from a force sensor of a force applied by the tool to the work piece;
use the signal and the stiffness model to determine the deformation of the robot due to the force applied by the tool to the work piece; and
use the determined deformation of the robot to modify the relative position between the tool and the work piece to compensate for the deformation of the robot during the machining.

DETAILED DESCRIPTION

As described above, the present invention improves the robotic machining accuracy by reducing machining force induced deformation. While thermal induced error is the largest error component for CNC machining, motion error due to machining force contributes to most of the total machining errors in robots. For example, a 500 N cutting force during a milling process will cause a 1 mm position error for a robot instead of a less than 0.01 mm error for a CNC machine. Therefore, in order to achieve higher dimensional accuracy during robotic machining, the deformation due to the interactive force must be compensated.

Since force measurement and subsequent compensation is carried out in a 3-D Cartesian space, a stiffness model, which relates the force applied at the robot tool tip to the deformation of the tool tip in Cartesian space, is crucial to realize deformation compensation. The model should be accurate enough for the prediction of robot structure deformation under arbitrary load conditions. At the same time, it needs to be simple enough for real time implementation. Detailed modeling of all the mechanical components and connections will render a model too complicated for real-time control, and difficult for accurate parameter identification.

Figure 1:
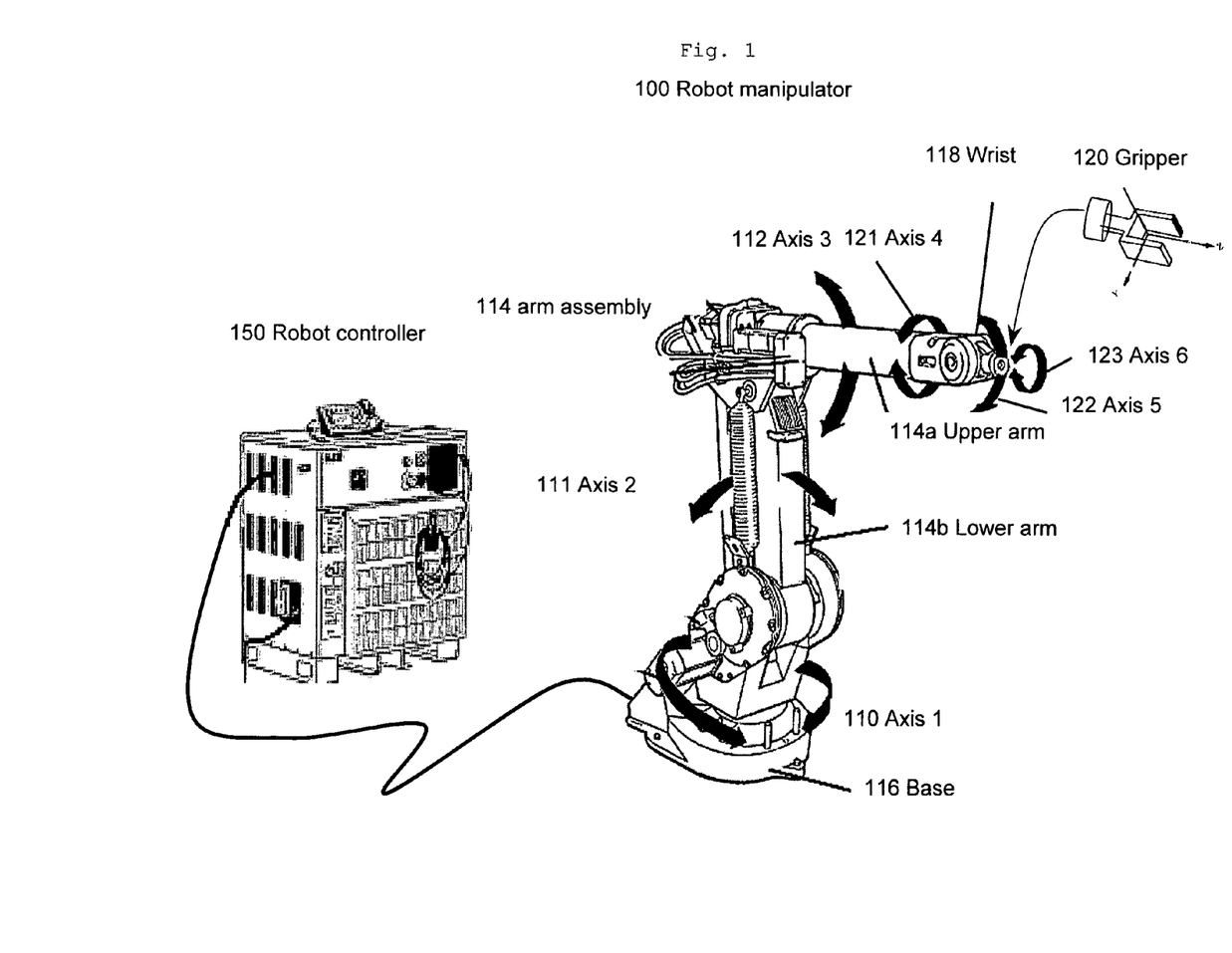
FIG. 1 shows a robot system with a 6-DOF industrial robot manipulator and a controller for the robot.

Referring now to FIG. 1, there is shown the structure of a 6-DOF (degree of freedom) industrial robot manipulator 100, such as the IRB 6400 robot available from ABB as of the filing date of the application from which this patent issued, with black arrows representing the location of the six compliant joints or axes 1-6 respectively identified in FIG. 1 as 110, 111, 112, 121, 122, 123. As is shown in FIG. 1, robot systems typically include the manipulator 100 and a computer-based controller 150.

The commonly used six-axis industrial robot manipulator 100 includes an arm assembly 114 comprising upper arm 114a and lower arm 114b. The arm assembly 114 has one end of the lower arm 114b mounted through axis 1 110 to a base 116, and a wrist 118 on the opposite end of the upper arm 114a. A grasping mechanism or gripper 120 configured to receive the tool or workpiece to be moved by the robot manipulator 100 is mounted to the wrist 118. The grasping mechanism or gripper 120 and tool or workpiece, or whatever devices are mounted to the robot wrist 118, are together known generally as an end effector and that term is used herein to, refer to grasping mechanism or gripper 120.

The robot arm assembly 114 can be driven about axis 1 110, axis 2 111, axis 3 112, axis 4 121, axis 5 122 and axis 6 123, collectively representing six degrees of freedom (DOF), to position the wrist 118 and thus the end effector 120 at any desired position within the operating range of the robot manipulator 100. These positions can be specified in terms of the positions and orientations of the end effector on each of the three-dimensional x, y and z axes of a robot Cartesian coordinate system.

Industrial robotic systems, such as the system shown in FIG. 1, are designed to achieve high positioning accuracy and high strength. Elastic properties of the arms 114a, 114b are insignificant. Therefore, the dominant contributing factor for a large deflection of the gripper 120 position is the joint compliance, e.g., due to gear transmission elasticity. Modeling of robot stiffness could be reduced to six rotational stiffness coefficients in the joint space. From the control point of view, this model is also easy to implement, since all industrial robot controllers are decoupled to single input single output (SISO) joint control at the servo level. As a result, the joint deformation can be directly compensated on the joint angle references passed to the servo controller 150. Since the axis of the force sensor (the force sensor is not shown in FIG. 1) coincides with the axis 6 123 of wrist 118, the stiffness of the force sensor and its connection flange could be modeled into that joint.

The stiffness model of robot 100 in Cartesian space is derived below based on joint compliance parameters.

In joint space, the model of robot 100 is represented as:

$$\tau = K_q \cdot \Delta Q \quad (1)$$

Where: $\tau$ is the torque load on the each joint; $K_q$ is a 6×6 diagonal matrix; $\Delta Q$ is the 6×1 deformation vector.

While in Cartesian space:

$$F = K_x \cdot \Delta X \quad (2)$$

Where F is the 6 DOF force vector, $\Delta X$ is the 6 DOF deformation of the robot 100 in Cartesian space, and $K_x$ is a 6×6 stiffness matrix.

From the definition of the Jacobian matrix:

$$\Delta X = J(Q) \cdot \Delta Q \quad (3)$$

Where J(Q) is the Jacobian matrix of the robot 100.

At the steady state, after compensating for the tool gravity force, the robot joint torques exactly balance external forces applied on the tool tip. The principle of virtual work gives:

$$F^T \cdot \Delta X = \tau^T \cdot \Delta Q \quad (4)$$

$K_x$, the 6×6 stiffness matrix, can be determined from equations (1), (3), (4), as:

$$K_x = J(Q)^{-T} K_q J(Q)^{-1} \quad (5)$$

Equation (5) is implemented in software in robot controller 150 of FIG. 1.

For an articulated robot, $K_x$ is not a diagonal matrix and it is configuration dependent. This means that:

1. the force and deformation in Cartesian space is coupled, in other words, the force applied in one direction will cause the deformation in all directions; and
2. in different locations, the stiffness matrix will take different values.

Table 1 shows one example of the Cartesian Stiffness Matrix for robot 100 where the units are N/mm for the upper left hand quadrant of the table, N/rad for the upper right hand quadrant of the table, N·mm/mm for the lower left hand quadrant of the table, and N·mm/rad for the lower right hand quadrant of the table.

TABLE 1

| 2.86E+02 | −8.78E+02 | 8.12E+02 | 1.49E+06 | 3.01E+05 | 3.97E+05 |
| −8.78E+02 | 2.39E+02 | 5.48E+03 | −1.85E+05 | −5.46E+05 | −4.09E+05 |
| 8.12E+02 | 5.48E+03 | 4.91E+02 | −4.56E+06 | 4.31E+05 | 8.62E+05 |
| 1.49E+06 | −1.85E+05 | −4.56E+06 | 7.53E+07 | 5.85E+08 | −7.62E+08 |
| 3.01E+05 | −5.46E+05 | 4.31E+05 | 5.85E+08 | 1.68E+08 | 3.20E+08 |
| 3.97E+05 | −4.09E+05 | 8.62E+05 | −7.62E+08 | 3.20E+08 | 1.30E+08 |

Experimental determination of joint stiffness parameters is critical in fulfilling real-time position compensation. In this model, the joint stiffness is an overall effect contributed by motor, joint link, and gear reduction units. It is not realistic to identify the stiffness parameter of each joint directly by disassembling the robot 100; the practical method is to measure it in Cartesian space.

Figure 2:
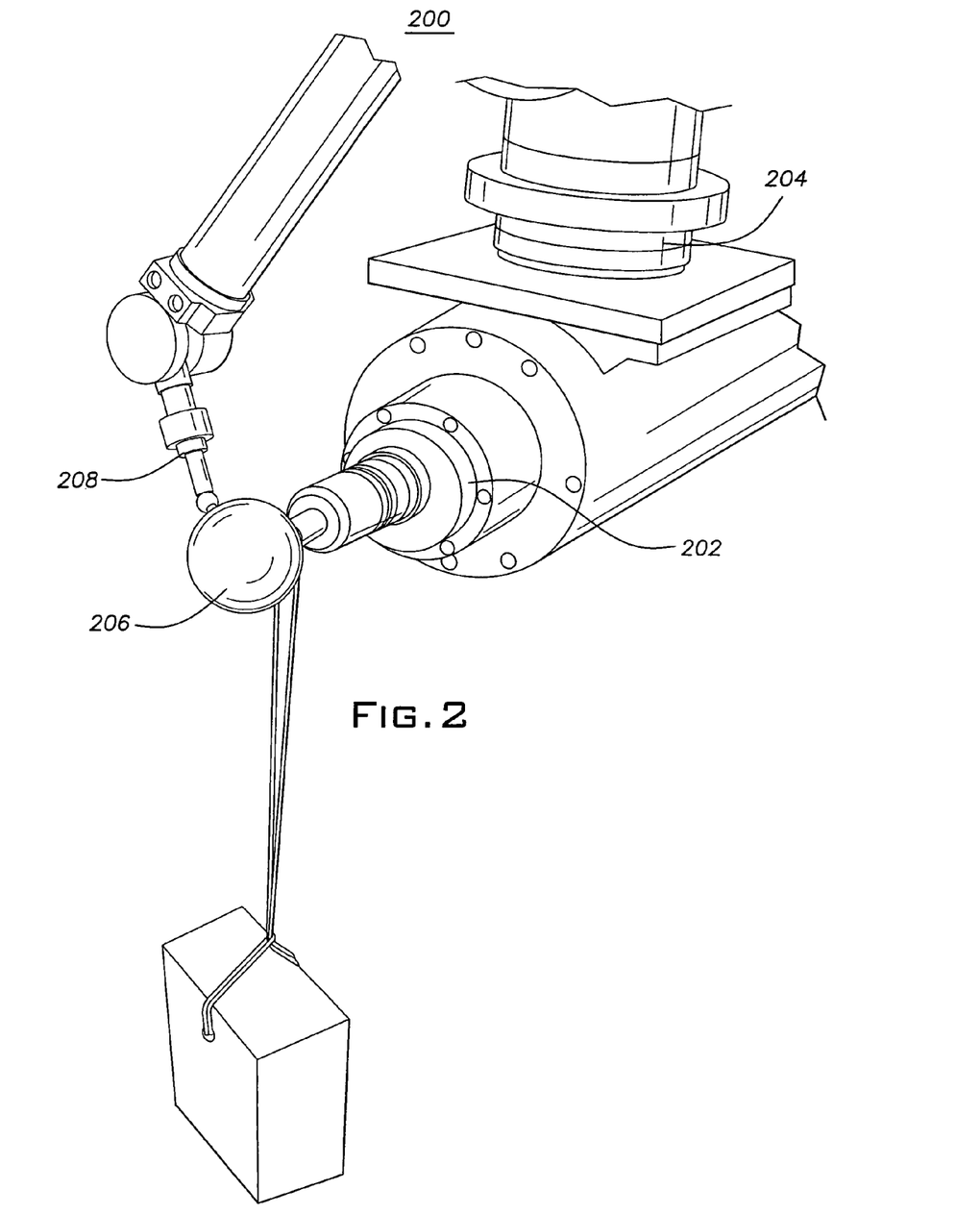
FIG. 2 shows a setup that can be used to experimentally determine the joint stiffness parameters of the robot.

Referring now to FIG. 2, there is shown the experimental setup 200 for measuring the stiffness of robot 100. Robot 100 has a spindle 202 and a force sensor 204. To be able to measure small deformations in 3-D space, the end-effector of robot 100 is equipped with a sphere-tip tool 206. A weight shown in FIG. 2 without a reference numeral is mounted on robot 100 adjacent to tool tip 206.

The tool tip 206 is set to a fixed point in the workspace, and the values of the six compliant manipulator axes shown in FIG. 1 are recorded. As is shown in FIG. 2, a given load is applied to the tool 206 by apparatus 208, causing the sphere-tip, a virtual center point, of tool 206 to move away from the original point. The original and deformed positions are measured with ROMER available from ROMER CimCore, a portable CMM 3-D digitizer, and the 3-DOF translational deformations are calculated.

From the combination of equations 2 and 5, $F = J(Q)^{-T} K_q J(Q)^{-1} \cdot \Delta X$ and $K_q$ can be solved by the least squares method. Table 2 shows the experimental data with different loads and corresponding deformations of robot where the units are Force: N for forces Fx, Fy and Fz; Displacement: mm for displacements dx, dy and dz.

TABLE 2

Test data for external force and corresponding robot deformations

| Fx | Fy | Fz | dx | dy | dz |
|---|---|---|---|---|---|
| −180 | 0 | 0 | −0.4561 | 0.1767 | −0.1211 |
| −360 | 0 | 0 | −0.9232 | 0.2812 | −0.2723 |
| −360 | 0 | 0 | −0.9604 | 0.2825 | −0.2452 |
| −180 | 0 | 0 | −0.4822 | 0.1983 | −0.0943 |
| −180 | 0 | 0 | −0.5359 | 0.2062 | −0.1103 |
| −360 | 0 | 0 | −0.9775 | 0.3464 | −0.2344 |
| −180 | 0 | 0 | −0.7276 | 0.0201 | −0.4238 |
| −360 | 0 | 0 | −1.423 | 0.0073 | −0.8206 |
| −360 | 0 | 0 | −1.4246 | −0.0099 | −0.7893 |
| −180 | 0 | 0 | −0.768 | 0.0184 | −0.44 |
| −180 | 0 | 0 | −0.7194 | 0.0518 | −0.4242 |
| −360 | 0 | 0 | −1.4357 | 0.0577 | −0.7922 |
| 0 | −275 | 25 | 0.0061 | −0.8927 | 0.0336 |

TABLE 2-continued

Test data for external force and corresponding robot deformations

| Fx | Fy | Fz | dx | dy | dz |
|---|---|---|---|---|---|
| 0 | −275 | 25 | −0.0004 | −0.9184 | −0.0111 |
| −40 | −295 | 10 | 0.134 | −1.1826 | −0.0926 |
| −40 | −295 | 10 | 0.1308 | −1.2146 | −0.1407 |
| −360 | 0 | 0 | −0.9344 | 0.2758 | −0.2987 |

Figure 3:
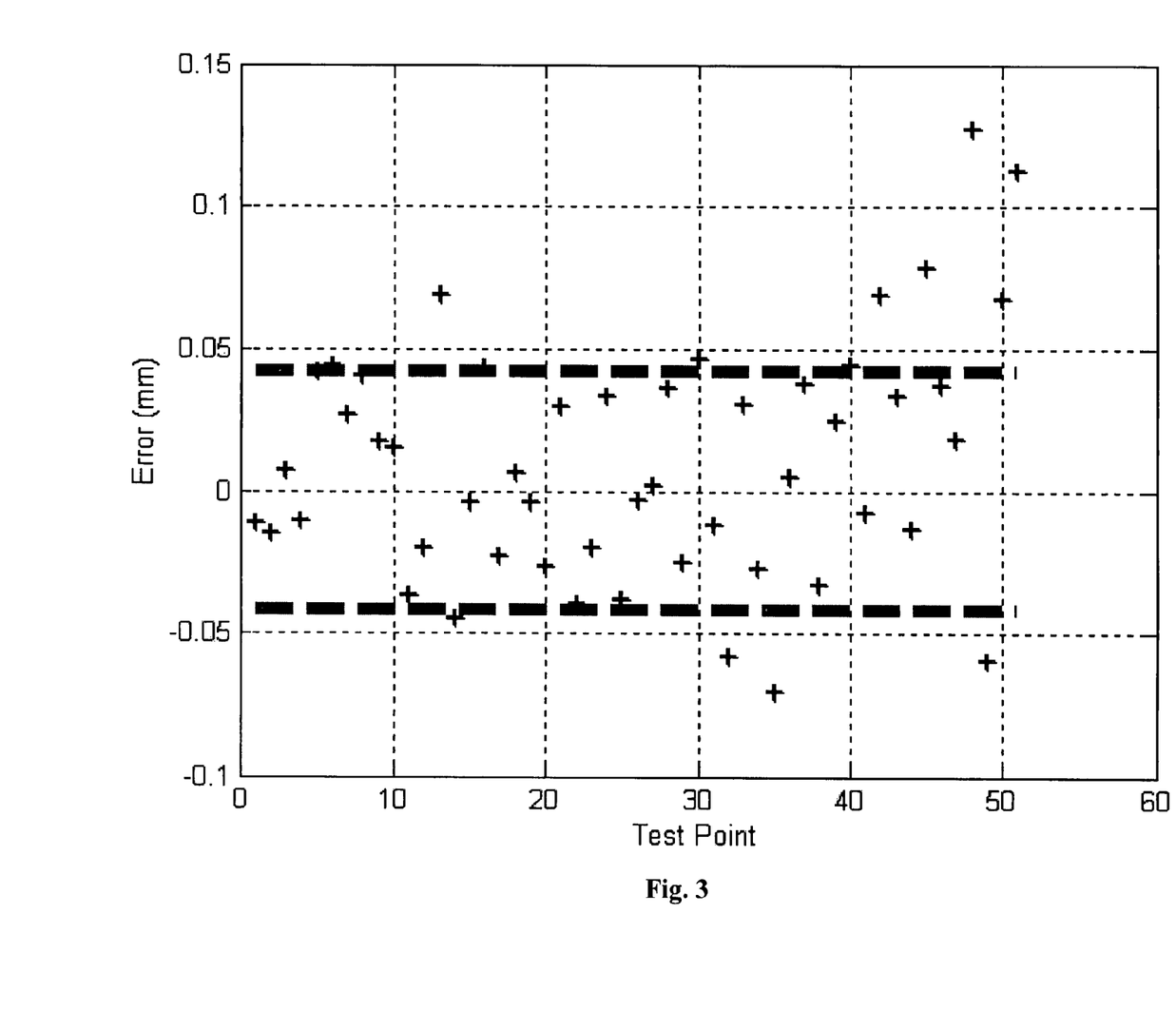
FIG. 3 shows the deviation resulting from the experimental determination of the robot joint stiffness parameters.

The tool tip 206 is then moved to one or more other fixed points in the robot workspace and the same procedure described above is performed at those other fixed points in the robot workspace. As is shown in FIG. 3 where the procedure described above was performed at a total of three locations, the deviation of the results is small, which means a set of constant model parameters could model the robot deformation with small error.

The major position error sources in a robotic machining process can be classified into two categories, (1) Machining force induced error, and (2) motion error (kinematic and dynamic errors, etc.). The motion error, typically in the range of 0.1 mm, is inherent from the robot position controller and would appear even in noncontact cases. While the machining force in the milling process is typically over several hundreds of Newton, the force-induced error, which could easily be as high as 0.5 mm, is the dominant factor of surface error. The present invention compensates for the deformation in real time to thereby improve the overall machining accuracy.

The existing research of robot deformation compensation is focused on gravity compensation, deflection compensation of large flexible manipulators, etc. Not much attention has been paid to the compensation of process force induced robot deformation due to the lack of understanding and modeling of robot structure stiffness, the lack of real time force information and limited access to the controller of industrial robot.

Figure 4:
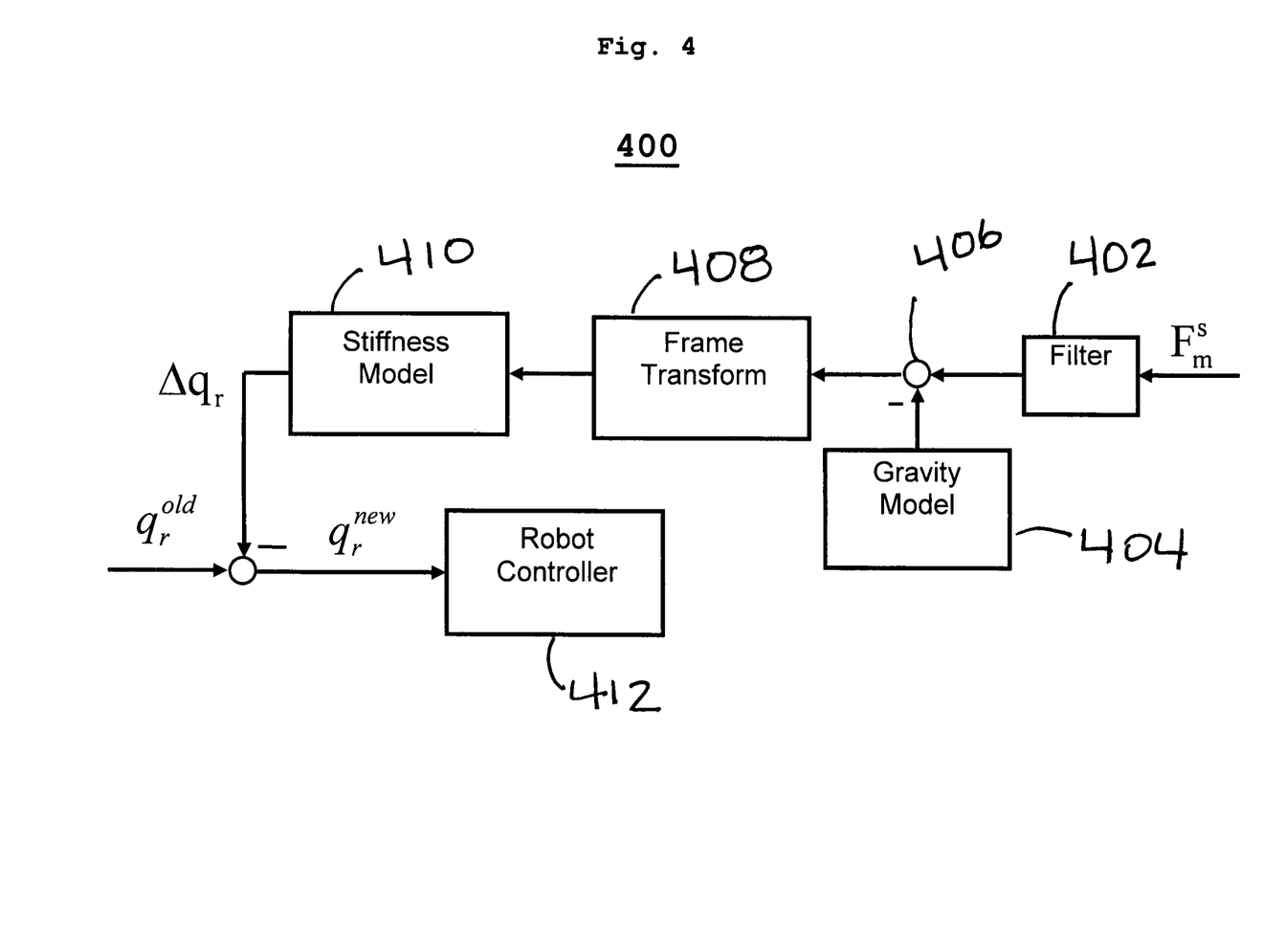
FIG. 4 shows a block diagram of the real time deformation compensation system of the present invention.

The block diagram of the real time deformation compensation system 400 is shown in FIG. 4. Filter 402 which is implemented in software in the robot controller 412 removes the noise from the output signal from the force sensor 204 of FIG. 2. A gravity model 404 which is implemented in software in the controller 412 is used at 406 to compensate the filtered force sensor output signal for the gravity of the spindle 202 of FIG. 2 and the cutter which is not shown in FIG. 2 but if shown it would replace the sphere 206 shown in that figure. It should be appreciated that while the description of FIG. 2 states that the end effector 120 of robot 100 is equipped with the cutter (in place of the sphere 206), the end effector may in robotic machining hold the work piece and the cutter may be mounted adjacent to the robot. In that instance gravity model 404 compensates for the gravity of the work piece.

The noise filtered and gravity compensated output signal from the force sensor 204 is translated into the robot tool frame at 408. This translation function is implemented in software in the controller 412. Based on the stiffness model 410 described above, the deformation due to machining force is calculated in real time using equations (2) and (5) and the joint reference for the robot controller 412 is updated. The stiffness model is implemented in software in the controller 412. While the robot controller in FIG. 4 has a different reference numeral than the robot controller 150 shown in FIG. 1, it should be appreciated that in accordance with the present invention the function of both controllers is the same.

In pre-machining processes, maximum MRRs (material removal rates) are even more important than precision and surface finish for process efficiency. MRR is a measurement of how fast material is removed from a workpiece. MRR can be calculated by multiplying the cross-sectional area (width of cut times depth of cut) by the linear feed speed of the tool:

$$MRR = w \cdot d \cdot f \quad (6)$$

where w is the width of cut (mm), d is the depth of cut (mm), f is feed speed (mm/s).

Conventionally, feed speed is kept constant in spite of the variation of the depth of cut and the width of cut during foundry part pre-machining process. Since most foundry parts have irregular shapes and uneven depth of cut, this will introduce a dramatic change of MRR, which would result in a very conservative selection of machining parameters to avoid tool breakage and spindle stall. The MRR control of the present invention dynamically adjusts the feed speed to keep MRR constant during the whole machining process.

Figure 5:
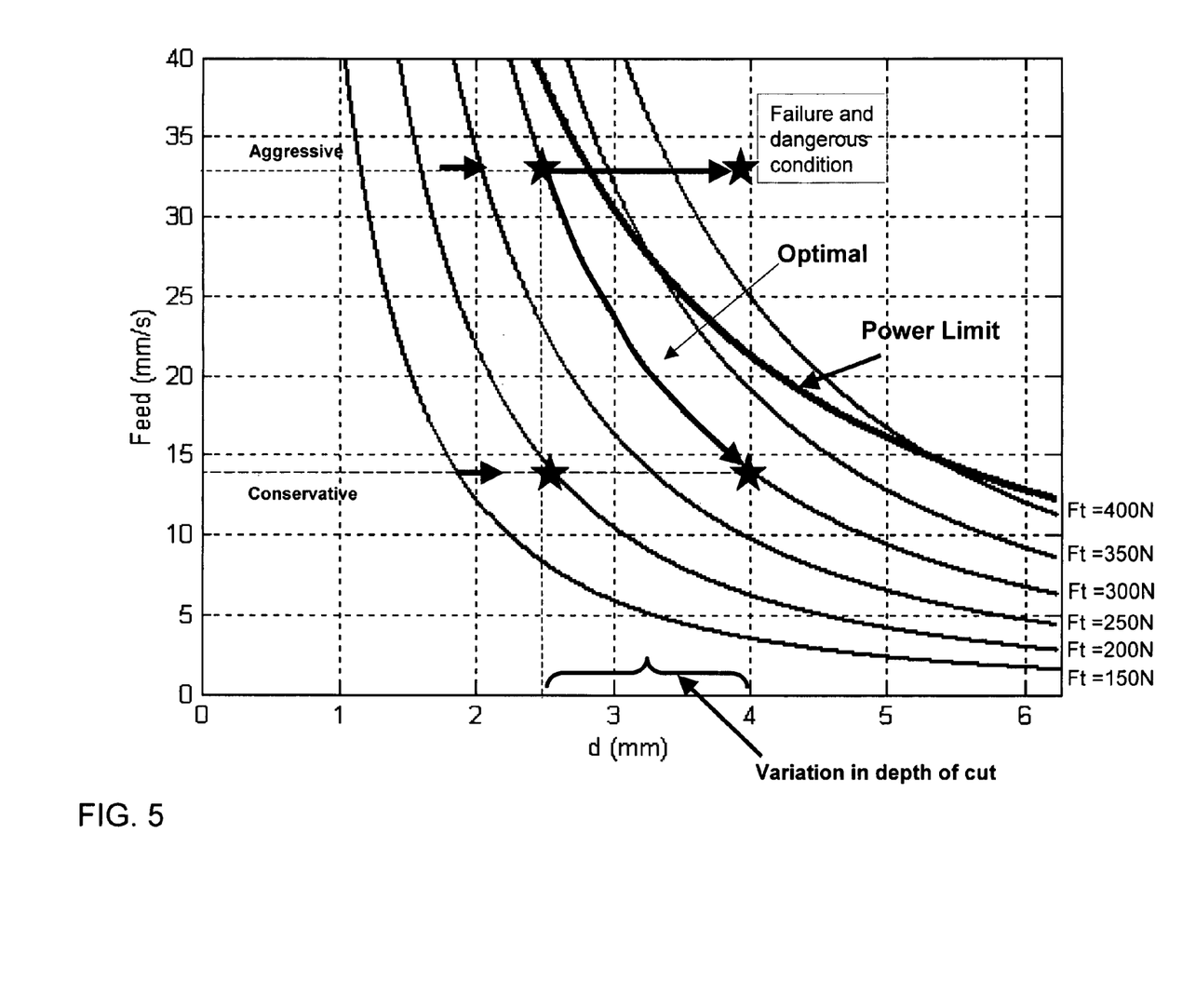
FIG. 5 shows the machining force as a function of both feed rate of the work pieces and cutting depth.

Shown in FIG. 5 is the machining force as a function of both feed rate and cutting depth. To maintain an aggressive constant feed speed of 33 mm/s while the depth of cut varies from 2.5 mm to 4 mm, the machining force would increase from 300 N to above 450 N, exceeding the power limit of the machining setup. Therefore in practice, to accommodate the depth changes, a conservative feed rate of 14 mm/s is typically selected. The ideal setting is to maintain a constant MRR, as a result and as is shown in FIG. 5, a much faster feed speed, instead of a conservative feed speed based on maximal depth of cut and width of cut position, could be adopted.

Since the value of MRR is difficult to measure, the MRR is controlled by regulating the cutting force, which is readily available in real-time from a 6-DOF force sensor, such as sensor 204 of FIG. 2, fixed on the robot wrist 118 of FIG. 1. Placing the analysis of the material removal process on a quantitative basis, the characterization of cutting force is important for research and development into the modeling, optimization monitoring and control of metal cutting.

Figure 6:
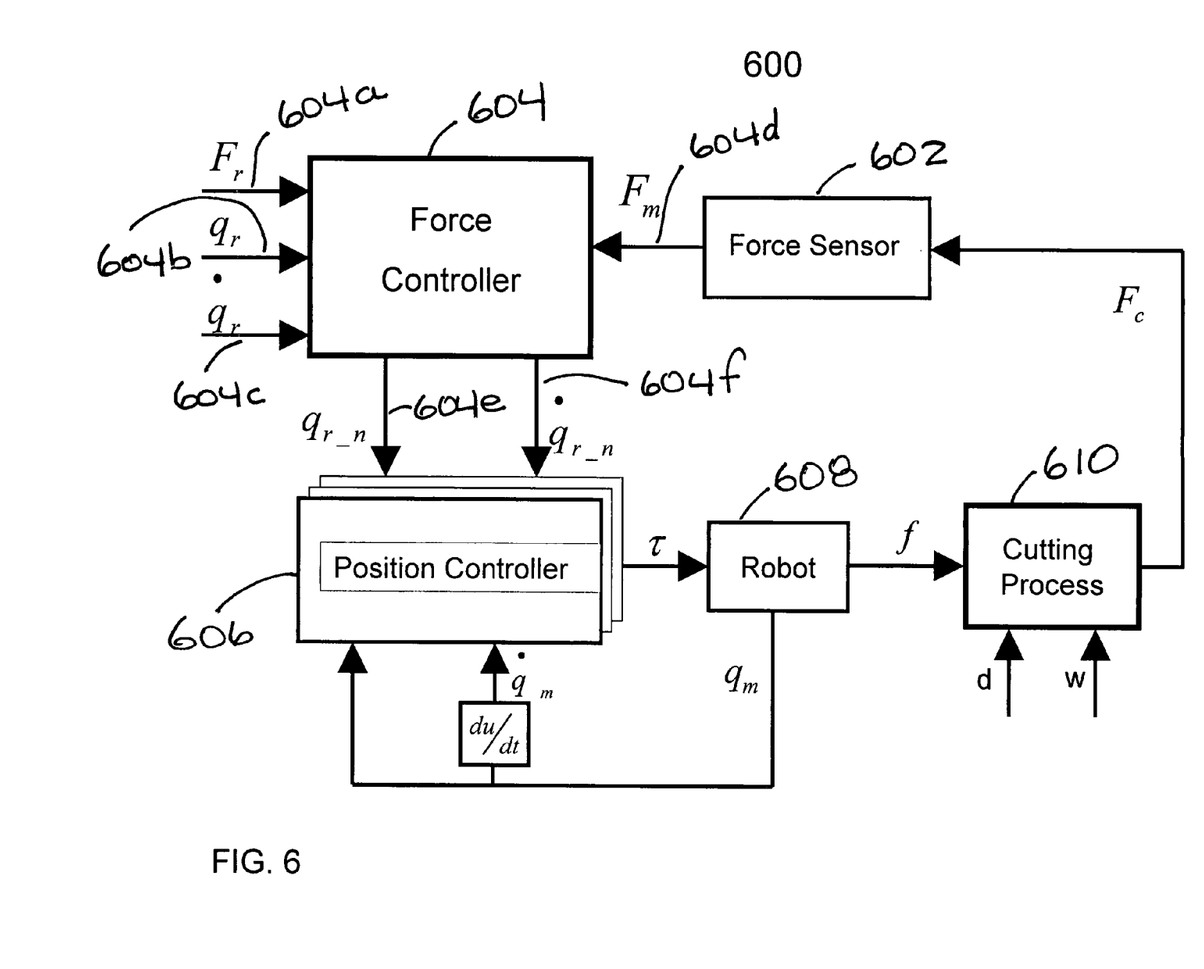
FIG. 6 shows a block diagram for the machining force control with controlled material removal rate in accordance with the present invention.

As the feed speed f is adjusted to regulate the machining force, MRR could be controlled under a specific spindle power limit avoiding tool damage and spindle stall. Also, controlled MRR means predictable tool life, which is very important in manufacturing automation. FIG. 6 shows the block scheme 600 of machining force control with controlled material removal rate (CMRR). In accordance with the present invention, the CMRR is provided by the robot controller (150 of FIG. 1 and 412 of FIG. 4).

In the present invention, the machining force in the cutting process is measured by force sensor 602 in real time. The Force Controller 604 takes the inputs of the force reference Fr at 604*a*, the force measurement Fm at 604*d*, the position reference $q_r$ at 604*b* and the speed reference which is the derivative of $q_r$ as shown in FIG. 6 by the dot above the q in $q_r$ at 604*c*, and using the force reference and the force measurement modifies the position and speed references, 604*e* and 604*f*, respectively, that pass to the Position Controller 606, so that the actual cutting speed of robot 608 for cutting process 610 is dynamically adjusted based on the actual machining force.

As is described by L. K. Daneshmend, H. A. Pak, 1986, "Model Reference Adaptive Control of Feed Force in Turning," *ASME Journal of Dynamic Systems, Measurement, and Control*, Vol. 108, No. 3, pp. 215-222, the structure of the cutting force in a milling operation is represented as a linear first-order model:

$$F = K \cdot w \cdot d \cdot f \frac{1}{\tau_m s + 1} \quad (7)$$

where $\tau_m$ is the machining process time constant. Since one spindle revolution is required to develop a full chip load, $\tau_m$ is 63% of the time required for a spindle revolution. Since the force control is implicitly implemented, the control loop bandwidth is limited by a position servo control, which is around 10 Hz for an industrial robot. The force process gain may be seen as $\theta = K \cdot w \cdot d$, which is sensitive to the process inputs. With the selection of reference feed speed $f_r$ and reference force $F_r$, both of which are process dependent, a PID controller is adopted to regulate the cutting force F, while force process gain $\theta$ changes.

As described above, the robot deformation subject to an arbitrary process force loading is modeled and the model parameter is experimentally measured. With this model, the online deformation scheme is implemented on the robot controller 412 of FIG. 4. Also described above is an implementation for controlled material removal rate using a robot. Experimental results have been obtained which validate the model and the implementation and they are presented below.

Figure 7:
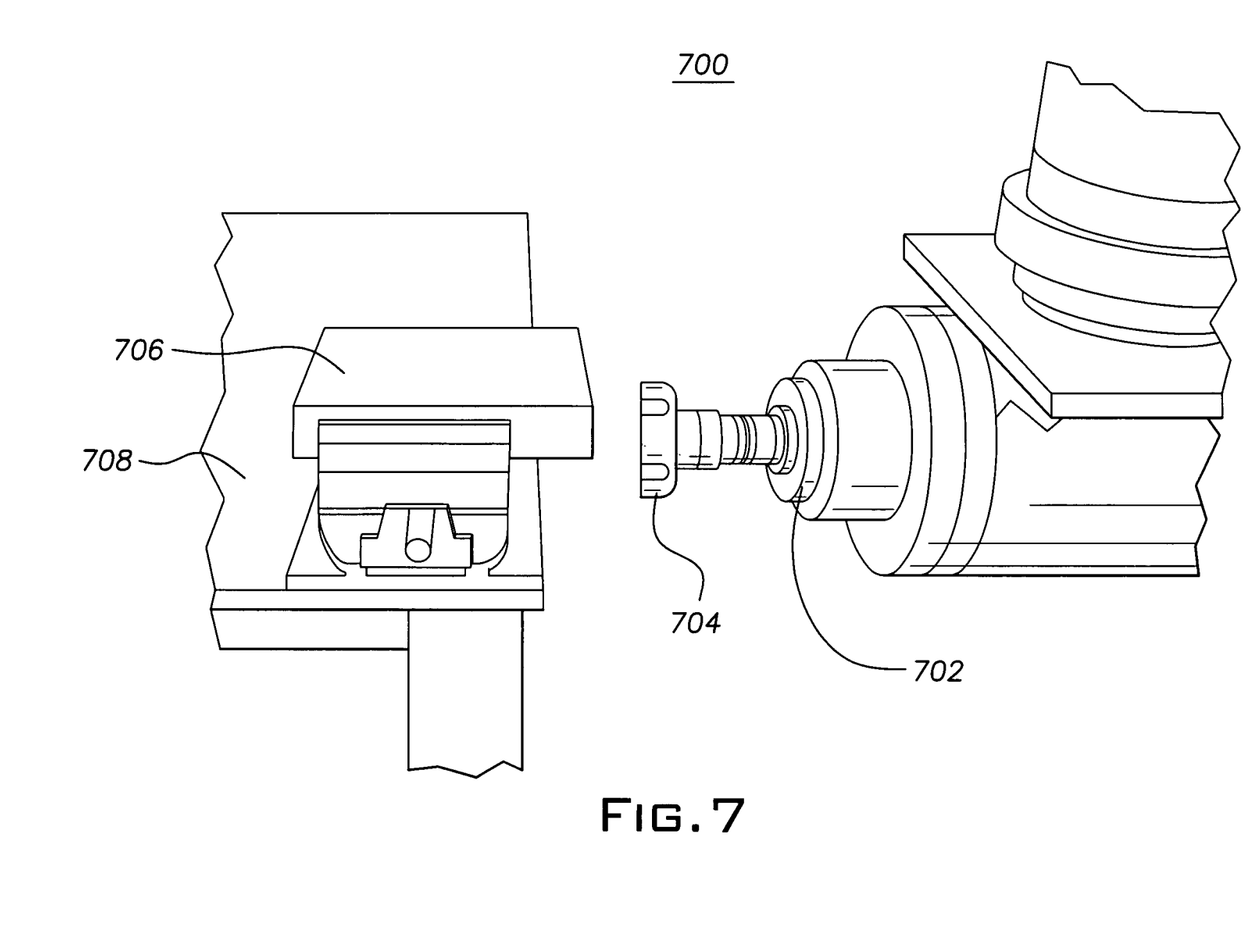
FIG. 7 show the experimental setup for a milling test in accordance with the present invention.

FIG. 7 shows the experimental setup 700 of a milling test. A spindle 702 is fixed on the robot arm (not shown) with a cutter 704 in place of sphere tip tool 206 of FIG. 2 and the workpiece 706 is fixed on a steel table 708. For illustration, a 6063 aluminum block is used as the workpiece 706 for testing purpose.

Figure 8:
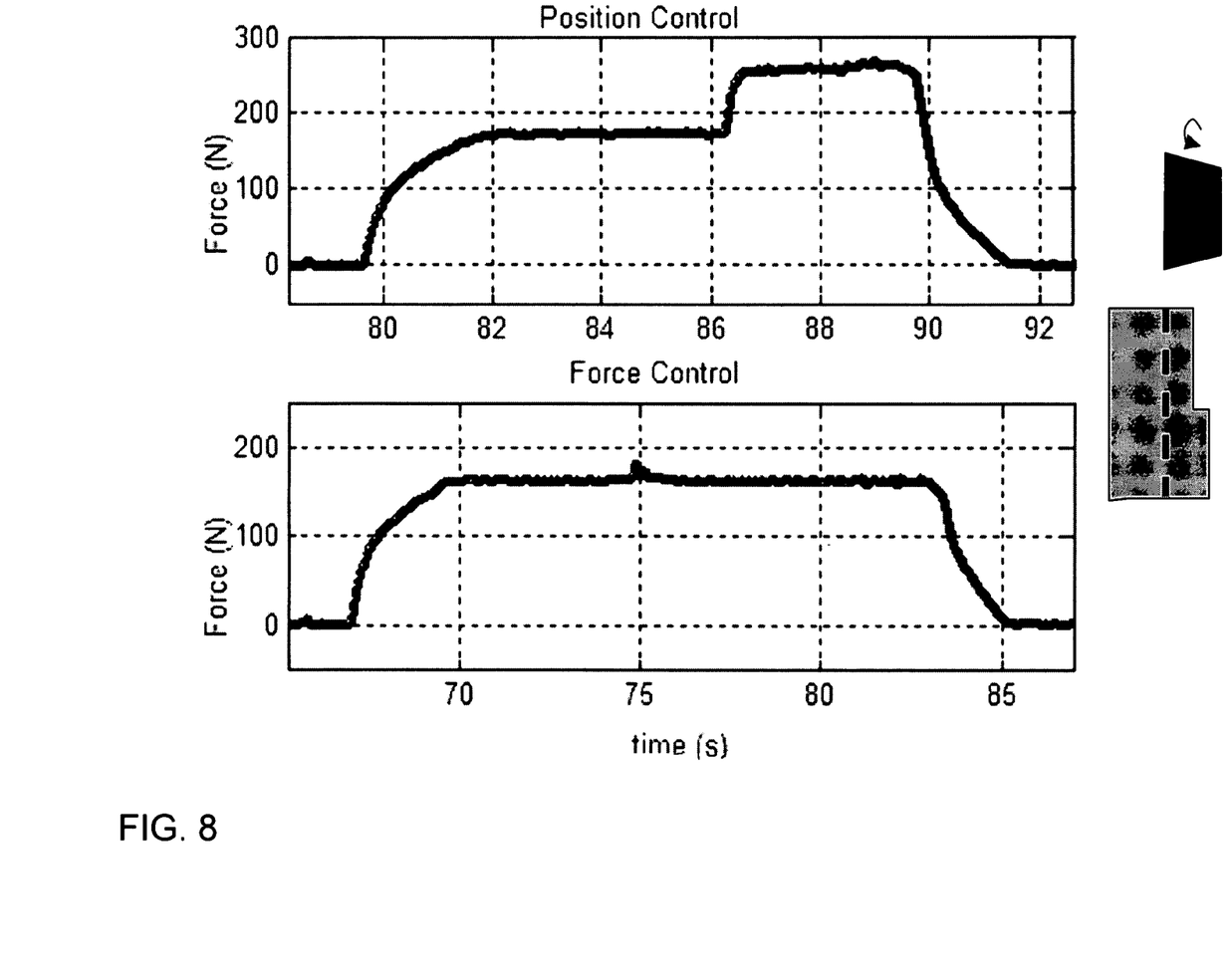
FIG. 8 shows the results of the milling test where the upper graph shows the cutting force with only position control and the lower graph shows the cutting force with force control.

Tests on aluminum block 706 with the depth of cut changed from 2 mm to 3 mm shows, when force control is activated, the cutting force is regulated in spite of the variance of depth of cut. This is shown in FIG. 8 where the upper graph shows the cutting force with only position control and the lower graph shows the cutting force with force control. A milling test of an aluminum workpiece 706 with a variation of the width of the cut obtained results similar to those shown in FIG. 8.

Thus in accordance with the present invention, the feed speed can be set as fast as the limit of spindle power. In a foundry parts milling or deburring process, the robot will not have to move at a very conservative speed to avoid tool breakage or spindle stall. The decrease of the cycle time resulting from the controlled material removal rate provided by the present invention is typically around 30% to 50% for different workpieces.

Figure 9A:
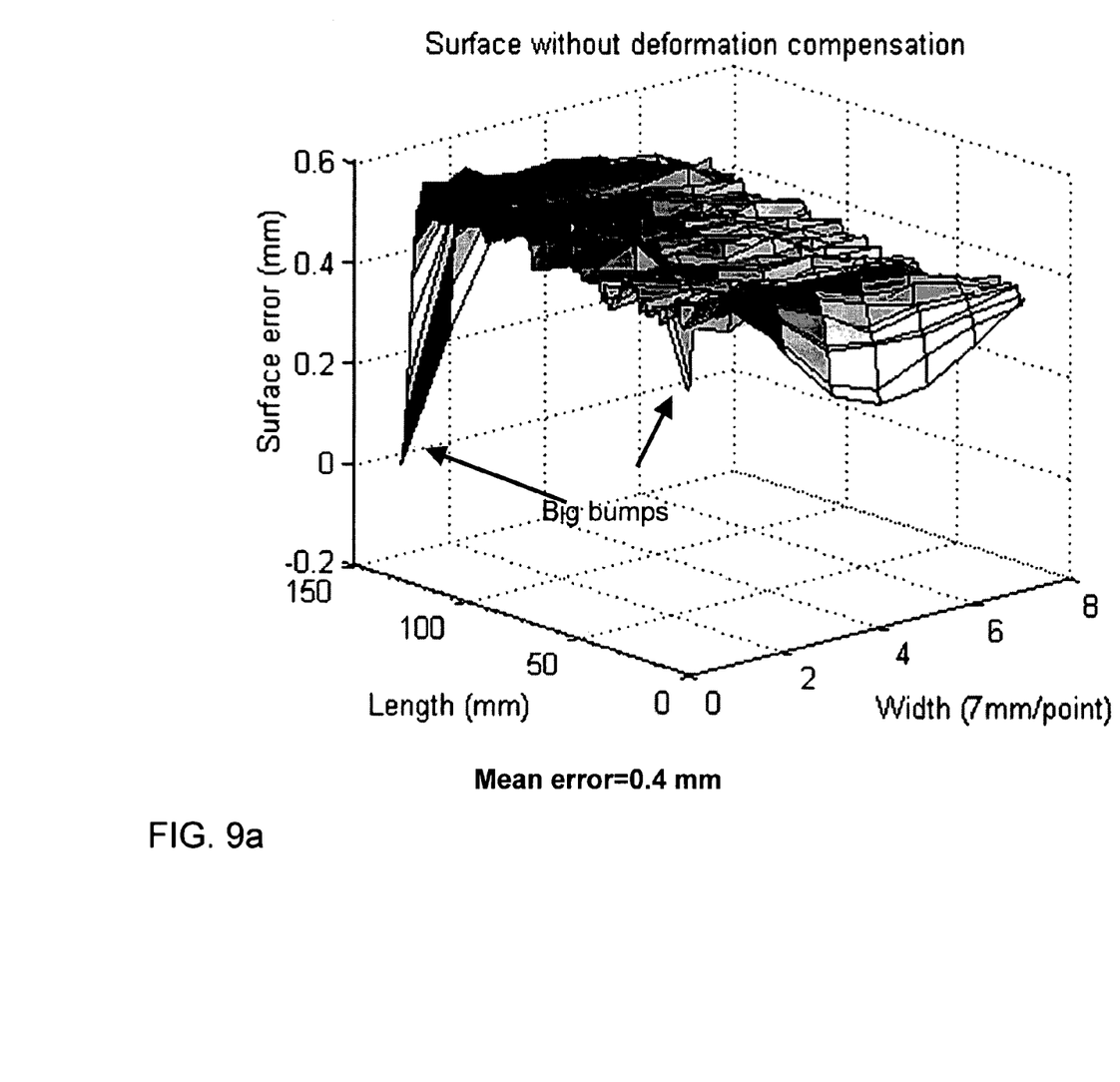
FIG. 9a shows the surface error when an aluminum block is milled without deformation compensation and FIG. 9b shows the surface error when an aluminum block is milled with deformation compensation.

In the deformation compensation test of milling an aluminum block, a laser displacement sensor is used to measure the finished surface. The surface error without deformation compensation, shown in FIG. 9a, demonstrates counter-intuitive results since an extra 0.5 mm was removed in the middle of the milling path.

Conventional wisdom says that a flexible machine would also cut less material due to deformation, since the normal force during cutting will always push the cutter away from the surface and cause a negative surface error. As used herein, negative surface error means less material was removed than the commanded position.

Figure 9B:
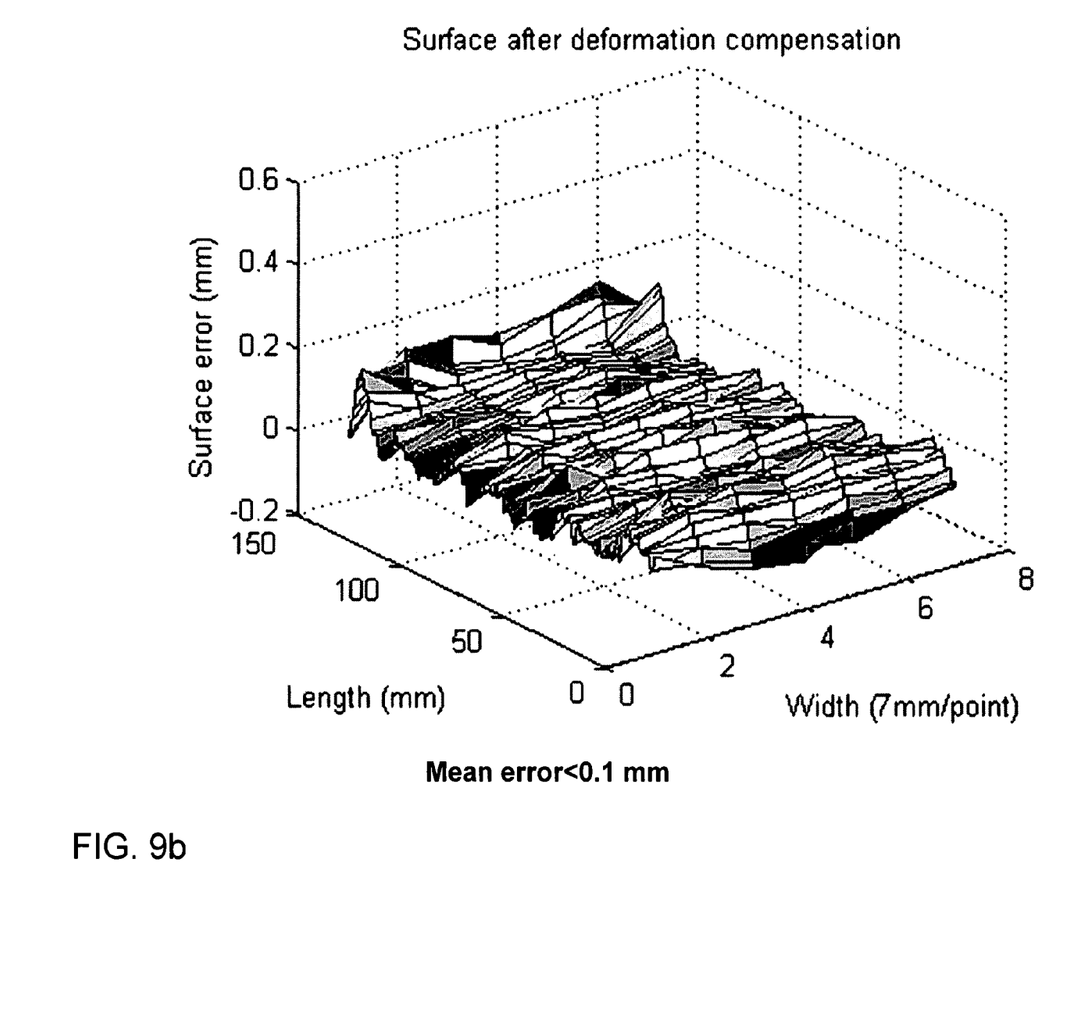

However, in the articulated robot structure, the deformation is also determined by the structure stiffness matrix, in a lot of cases, and thus a less stiff robot could cut more material than programmed. The coupling of the robot stiffness model explains this phenomenon and therefore the force in the feed direction and cutting direction will result in positive surface error in that robot configuration. Since the feed force and the cutting force are the major components in this setup, the overall effect will cut the surface 0.5 mm more than the commanded depth. The result after deformation compensation (see FIG. 9b) shows a less than 0.1 mm surface error, which is in the range of robot path accuracy.

FIG. 7 has shown the tool used for machining work piece 706 in the form of cutter 704 held by the grasping mechanism or gripper 120 of FIG. 1 of robot 100 and the work piece 706 fixed adjacent the robot 100. It should be appreciated that the grasping mechanism or gripper 120 can, as is well known in the art, hold the work piece 706 and the tool 704 can be held by a spindle adjacent to the robot 100. It should also be appreciated that in accordance with the present invention, the force sensor 602 of FIG. 6 is mounted either on the robot 100 or together with the tool, such as cutter 704, or work piece 706 adjacent to the robot 100.

It should further be appreciated that the present invention uses a signal which is a measure of or representative of the force applied by the tool to the work piece, to:
  infer the relative motion between the work piece and the tool to control the MRR; and/or
  modify the relative position between the tool and the work piece to thereby compensate for deformation of the work piece by the tool.

It should further be appreciated that the signal which is a measure of or representative of the force applied by the tool to the work piece may or may not come from a force sensor. In controlling the relative position between the tool and the work piece the present invention always uses a force sensor as the source of the signal representative of the force applied by the tool to the work piece. In controlling the motion between the tool and the work piece to thereby control the MRR, the signal representative of the force applied by the tool to the work piece can be obtained either from a force sensor or from some other means such as the current flowing in the motor for the spindle 202 of FIGS. 2 and 702 of FIG. 7. It is well known to those of ordinary skill in this art that the current flowing in the motor for the spindle is proportional to the machining force applied by the tool to the work piece.

It should further be appreciated that while the force sensor is shown in FIG. 2 as mounted on the robot it is not necessary for the functioning of the present invention that the force sensor be mounted only on the robot. The force sensor may be mounted with the tool or work piece that is adjacent to the robot.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. In a system having a robot and a tool for machining a work piece, the robot including a plurality of robot joints, a method for compensating for deformation of the robot joints during said machining comprising:
  obtaining a stiffness model using joint angles only, said stiffness model relating the force applied at a tip of said tool to the deformation of said tool tip;
  obtaining after said stiffness model is obtained a signal from a force sensor of a force applied by said tool to said work piece;
  using said signal and said stiffness model to determine the deformation of said robot joints due to said force applied by said tool to said work piece; and using said determined deformation of said robot joints to modify the relative position between said tool and said work piece to compensate for said deformation of said robot during said machining.

2. The method of claim 1 further comprising mounting said force sensor either on said robot or together with said tool or work piece adjacent to said robot.

3. The method of claim 1 further comprising mounting said force sensor either on said robot or together with said tool or work piece adjacent to said robot to thereby provide said signal.

4. The method of claim 1 wherein said robot is a six degree of freedom robot having six axes of rotation.

5. The method of claim 4 wherein said stiffness model is determined prior to said machining by:
applying a load to said tool at one or more different robot orientations and measuring the displacement of said tool under load.

6. The method of claim 1 wherein said stiffness model comprises rotational stiffness coefficients for said plurality of robot joints.

7. The method of claim 1 wherein $K_q$ is solved using least squares method according to: $F=J(Q)^{-T}K_q J(Q)^{-1}\Delta X$.

8. The method of claim 1 wherein said stiffness model relates the force applied in one direction at a tip of said tool to the deformation of said tool tip in all directions.

9. In a system having a robot and a tool held by said robot for machining a work piece a method for compensating for variability of height of the surface of said work piece during said machining comprising:
determining a stiffness model prior to said machining by applying a load to said tool at one or more different robot orientations and measuring the displacement of said tool under load;
using only said tool held by said robot to remove material from said surface of said work piece;
setting a constant material removal rate for said tool to remove material from said surface of said work piece;
generating from a force sensor mounted on said tool a signal representative of the force applied in real time to said work piece by said tool during said machining of said work piece by said tool; and
using said force sensor signal and said stiffness model to modify the relative position between said tool and said work piece to maintain a constant material removal rate during said machining of said work piece by said tool.

10. A controller for controlling a robot having a plurality of joints and carrying a tool for machining a work piece, said controller having software executable to:
obtain a stiffness model using joint angles only, said stiffness model relating the force applied at a tip of said tool to the deformation of said tool tip;
obtain after said stiffness model is obtained a signal from a force sensor of a force applied by said tool to said work piece;
use said signal and said stiffness model to determine the deformation of said robot due to said force applied by said tool to said work piece; and
use said determined deformation of said robot to modify the relative position between said tool and said work piece to compensate for said deformation of said robot during said machining.

11. The controller of claim 10 wherein said stiffness model comprises rotational stiffness coefficients for said plurality of robot joints.

12. The method of claim 11 wherein $K_q$ is solved using least squares method according to: $F=J(Q)^{-T}K_q J(Q)^{-1}\Delta X$.

13. The controller of claim 11 wherein said stiffness model relates the force applied in one direction at a tip of said tool to the deformation of said tool tip in all directions.

* * * * *